(12) United States Patent
Yasoshina et al.

(10) Patent No.: US 9,732,655 B2
(45) Date of Patent: Aug. 15, 2017

(54) EXHAUST PURIFYING DEVICE FOR INTERNAL COMBUSTION ENGINE

(71) Applicant: HONDA MOTOR CO., LTD., Tokyo (JP)

(72) Inventors: Sayaka Yasoshina, Tokyo (JP); Ryo Saito, Saitama (JP); Akihito Kasai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/535,752

(22) Filed: Nov. 7, 2014

(65) Prior Publication Data

US 2016/0131008 A1     May 12, 2016

(51) Int. Cl.
    *F01N 3/34*     (2006.01)
    *F01N 3/32*     (2006.01)
    *F01N 3/20*     (2006.01)
    *F01N 3/10*     (2006.01)

(52) U.S. Cl.
CPC ............... *F01N 3/32* (2013.01); *F01N 3/101* (2013.01); *F01N 3/20* (2013.01); *F01N 3/34* (2013.01); *F01N 2290/10* (2013.01); *F01N 2340/02* (2013.01); *F01N 2590/10* (2013.01); *Y02T 10/22* (2013.01)

(58) Field of Classification Search
CPC .... F01N 3/227; F01N 3/22; F01N 3/30–3/34; F01N 2290/10
See application file for complete search history.

(56) References Cited

FOREIGN PATENT DOCUMENTS

| DE | 2815887 C2 * | 11/1984 | ............... F01N 3/34 |
| JP | 56-127313 U | 1/1981 | |
| JP | 2014-173518 A | 9/2014 | |

OTHER PUBLICATIONS

Machine translation of DE 2815887 A1, accessed Feb. 15, 2016.*
Manual translation of JP 56127313U, provided May 2016.*
English translation of JP S56-127313 submitted in this application in Information Disclosure Statement filed on Nov. 7, 2014 (1 page).

* cited by examiner

*Primary Examiner* — Jonathan Matthias
(74) *Attorney, Agent, or Firm* — Westerman, Hattori, Daniels & Adrian, LLP

(57) ABSTRACT

The device includes an exhaust passage having an upstream end connected to an exhaust port of the engine and a downstream end provided with a catalytic converter, a secondary air passage having a downstream end connected to an intermediate point of the exhaust passage and an upstream end communicating with the atmosphere, and a reed valve provided in an upstream end of the secondary air passage to permit air flow from the atmosphere to the exhaust passage but not in the opposite direction. The reed valve has a resonance frequency which is z times the prescribed exhaust frequency of the engine, where z is an integer. The length of the secondary air passage is selected that the pulsation effect of air in the secondary air passage may be advantageously utilized.

5 Claims, 4 Drawing Sheets

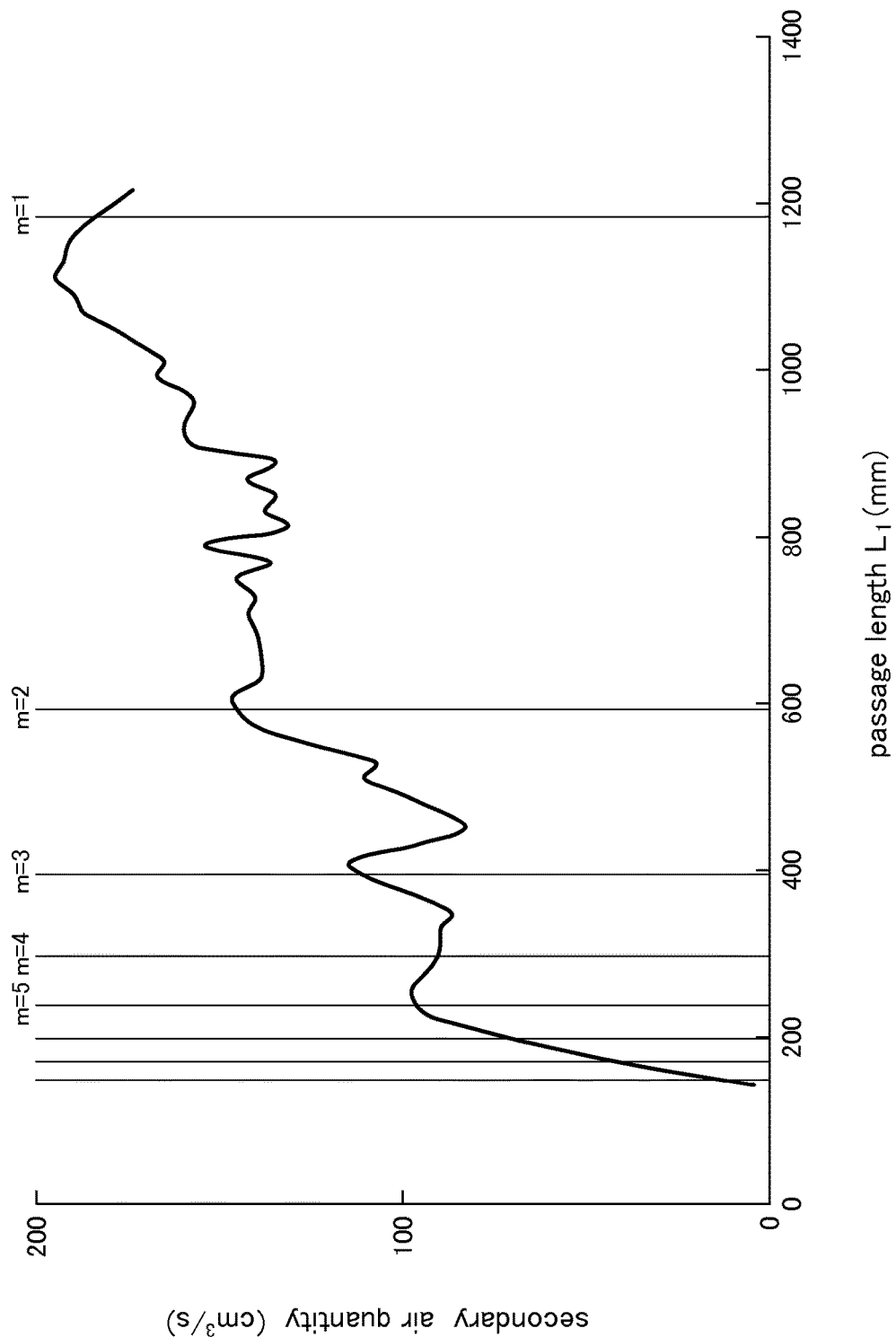

EXHAUST PURIFYING DEVICE FOR INTERNAL COMBUSTION ENGINE

TECHNICAL FIELD

The present invention relates to an exhaust purifying device for internal combustion engines, and in particular to an exhaust purifying device including an exhaust passage provided with a catalytic converter and a secondary air supply passage connected to a part of the exhaust passage upstream of the catalytic converter.

BACKGROUND OF THE INVENTION

The exhaust purifying device of a general-purpose engine may include an exhaust passage provided with a catalytic converter, a secondary air passage having a downstream end connected to an intermediate point of the exhaust passage and an upstream end communicating with the atmosphere and a reed valve provided in an upstream end of the secondary air passage to permit air flow from the atmosphere to the exhaust passage but not in the opposite direction. See JP2014-173518A, for instance. The reed valve is configured to close the secondary air passage during the positive pressure phase of the exhaust pulsation that is produced in the exhaust passage, and open the secondary air passage during the negative pressure phase of the exhaust pulsation. Owing to this action of the reed valve, secondary air (fresh air) can be supplied to the catalytic converter while the exhaust is prevented from being released via the secondary air passage. The secondary air may also be introduced into the exhaust passage by using a pump, but the use of a reed valve is more advantageous in terms of cost and size.

However, when a reed valve is used for introducing the secondary air into the exhaust passage, because the open period of the reed valve is dictated by the negative pressure that may be created by the exhaust pulsation, the quantity of the secondary air that may be supplied to the catalytic converter may not be so great as desired. To overcome this problem, it was proposed to adjust the length of the secondary air passage so that the negative pressure that is created in the reed valve may be amplified by the pulsation of air in the secondary air passage, and the quantity of the secondary air admitted by the reed valve may be increased. See JP56-127313U, for instance.

Therefore, there has been a demand to increase the quantity of the secondary air that can be supplied to the catalytic converter of an exhaust system of internal combustion engines without complicating the exhaust system.

SUMMARY OF THE INVENTION

In view of such problems of the prior art, a primary object of the present invention is to provide an exhaust purifying device for internal combustion engines that allows a relatively large quantity of secondary air to be supplied to the catalytic converter of the exhaust system with a simple and economical arrangement.

Such an object can be accomplished by providing an exhaust purifying device for an internal combustion engine designed to operate at a prescribed exhaust frequency, comprising: an exhaust passage having an upstream end connected to an exhaust port of an engine and a downstream end provided with a catalytic converter; a secondary air passage having a downstream end connected to an intermediate point of the exhaust passage and an upstream end communicating with the atmosphere; and a reed valve provided in an upstream end of the secondary air passage to permit air flow from the atmosphere to the exhaust passage but not in the opposite direction; wherein the reed valve has a resonance frequency which is z times the prescribed exhaust frequency of the engine, where z is an integer.

Thus, the reed valve is given a tendency to vibrate or open at the resonance frequency thereof under the external force provided mainly by the pulsation of the exhaust pressure in the exhaust passage so that the reed valve is allowed to open z times during each cycle of the engine operation. In the case of a two stroke engine, an exhaust stroke occurs in every single revolution of the engine so that the exhaust frequency is equal to the rotational frequency of the engine. In the case of a four stroke engine, an exhaust stroke occurs in every two revolutions of the engine so that the exhaust frequency is one half of the rotational frequency of the engine.

Preferably, the resonance frequency of the reed valve is two to five times the prescribed exhaust frequency of the engine ($2 \leq z \leq 5$).

Thereby, the quantity of the secondary air to be supplied can be increased without requiring the stiffness of the reed of the reed valve to be excessively reduced.

According to a certain aspect of the present invention, the engine consists of a four stroke engine, and the length $L_1$ (m) of the secondary air passage as measured between the downstream end thereof and the reed valve is given by the following equation:

$$m = 30a/(znL_1)$$

where m is the order of pressure resonant pulsation in the secondary air passage which is no greater than 5, a is the speed of sound (m/s) and n is the rotational speed (rpm) of the engine.

According to another aspect of the present invention, the length $L_1$ (m) of the secondary air passage as measured between the downstream end thereof and the reed valve is given such that the order of inertia effect resonance q given by the following equation is between 0.5 and 1.5, more preferably about 1:

$$q = (\theta/720)(30a/nL_1)$$

where $\theta$ is the open period (crank angle) of an exhaust valve for opening and closing the communication between the exhaust passage and the combustion chamber, a is the speed of sound (m/s) and n is the rotational speed (rpm) of the engine.

According to the present invention, the quantity of secondary air that can be supplied to the catalytic converter can be increased.

BRIEF DESCRIPTION OF THE DRAWINGS

Now the present invention is described in the following with reference to the appended drawings, in which:

FIG. 4 is a graph showing the relationship between the length of the secondary air passage and the quantity of the supplied secondary air.

DESCRIPTION OF THE PREFERRED EMBODIMENT(S)

In the illustrated embodiment, the present invention is applied to a four stroke engine for use in an electric generator designed to be operated at a constant rotational speed although the present invention is not limited to such applications, but is applicable to any internal combustion engines.

Figure 1:
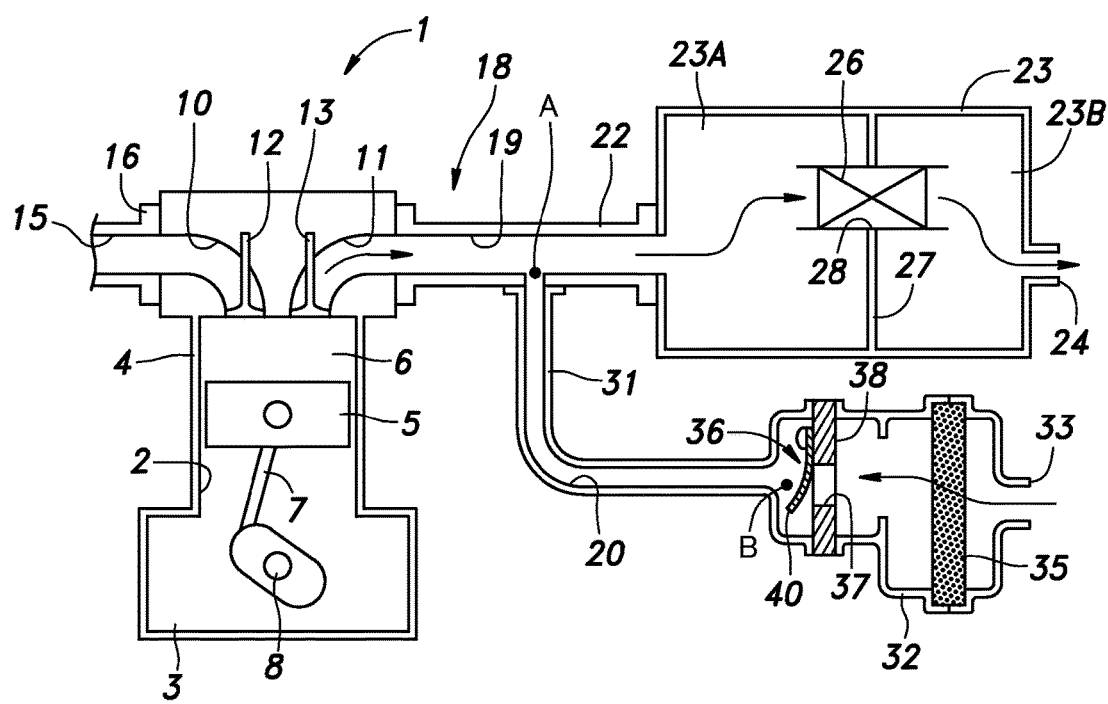
FIG. 1 is a diagram depicting the overall structure of the exhaust purifying device embodying the present invention.

Referring to FIG. 1, the engine 1 is provided with an engine main body 4 having a cylinder 2 and a crank chamber 3 defined therein. A piston 5 is slidably received in the cylinder 2, and the top face of the piston 5 and the cylinder wall define a combustion chamber 6 in cooperation with a cylinder head. The piston 5 is connected to a crankshaft 8 rotatably supported by the engine main body 4, via a connecting rod 7. The engine main body 4 is formed with an intake port 10 communicating with the combustion chamber 6 and opening out from a side face of the engine main body 4, and an exhaust port 11 communicating with the combustion chamber 6 and opening out from the other side face of the engine main body 4. The intake port 10 is provided with an intake valve 12, and the exhaust port 11 is provided with an exhaust valve 13. These valves 12 and 13 are actuated by a valve actuating mechanism (not shown in the drawings) at a prescribed timing according to the four stroke combustion cycle.

To the outer open end of the exhaust port is connected an intake device 16 provided with an intake passage 15 for supplying fresh air into the combustion chamber 6. The intake device 16 is attached to the engine main body 4, and the downstream end of the intake passage 15 is connected to the intake port 10. Although not shown in the drawings, the intake device 16 is provided with an intake inlet, an air cleaner, a throttle valve and a carburetor, in that order in the direction of the intake flow.

To the open outer end of the exhaust port 11 is connected an exhaust device 18 provided with an exhaust passage 19 for expelling the exhaust (combusted gas) created by the combustion of fuel in the combustion chamber 6 to the atmosphere and a secondary air passage 20 for introducing fresh air (secondary air) into the exhaust passage 19. The exhaust passage 19 is defined by an exhaust pipe 22 having an upstream end connected to the exhaust port 11 and a muffler 23 is connected to the downstream end of the exhaust pipe 22. The muffler 23 is provided with an exhaust outlet 24 for expelling the exhaust to the atmosphere. The muffler 23 may be provided with any per se known structure, and is generally provided with a larger cross section than the exhaust pipe 22. So far, the engine structure is no different from per se known engine structures.

The muffler 23 is internally provided with a catalytic converter 26. In this case, the interior of the muffler 23 is separated by a single partition wall 27 into a pair of expansion chambers 23A and 23B defined on either side thereof. The partition wall 27 is provided with a relatively narrow communication passage 28 communicating the two expansion chambers 23A and 23B with each other, and the catalytic converter 26 is provided in this communication passage 28. The catalytic converter 26 may consist of a per se known three-way catalytic converter. Owing to this structure, the exhaust produced from the combustion chamber 6 passes the exhaust port 11, the exhaust pipe 22, the first expansion chamber 23A of the muffler 23, the catalytic converter 26, and the second expansion chamber 23B of the muffler 23, in that order, before being expelled to the atmosphere.

The secondary air passage 20 is defined by a first passage member 31 and a second passage member 32 which are connected to each other. The first passage member 31 consists of a pipe member having a downstream end connected to and communicating with an intermediate point of the exhaust passage 19. The upstream end of the first passage member 31 is connected to the downstream end of the second passage member 32. The second passage member 32 has a greater diameter than the first passage member 31. The upstream end of the second passage member 32 remote from the first passage member 31 defines an air inlet 33. Thus, the secondary air passage 20 extends from the air inlet 33 to the exhaust passage 19 via the interior of the second passage member 32 and the first passage member 31, in that order.

The second passage member 32 is internally provided with an air filter 35 and a reed valve 36 in that order in the direction of the secondary air flow. The air inlet (or the upstream end) 33 of the secondary air passage 20 defined in the second passage member 32 communicates directly with the atmosphere. The secondary air is thus introduced from the air inlet 33 of the secondary air passage 20, and supplied to the intermediate point of the exhaust passage 19.

Figure 2:
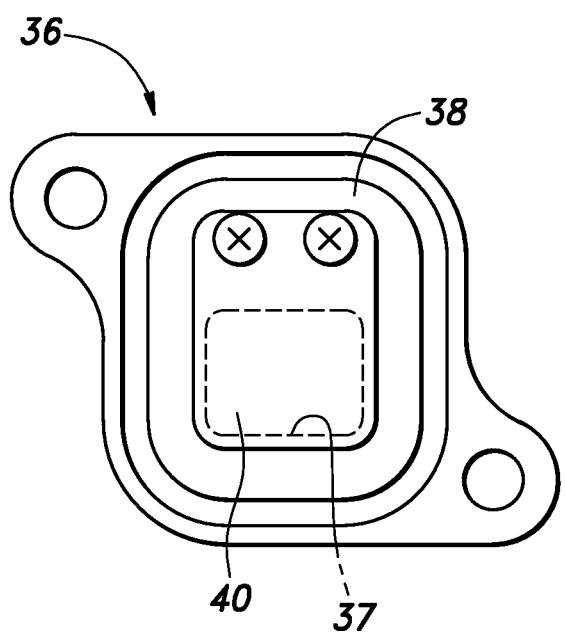
FIG. 2 is a front view of the reed valve in the exhaust purifying device.

As shown in FIG. 2, the reed valve 36 includes a valve base 38 extending across the second passage member 32 and defining a valve opening 37 therein, and a valve member or a reed 40 consisting of an elastic plate member having an end attached to the downstream side of the valve base 38 in the manner of a cantilever. The reed 40 is configured such that the reed 40 normally closes the valve opening 37, but when the pressure of the downstream side thereof is lower than that of the upstream side thereof by a prescribed quantity, deflects toward the downstream end to thereby open the valve opening 37 so that the downstream side of the secondary air passage 20 communicates with the atmosphere via the valve opening 37 and the air inlet 33. Conversely, when the reed 40 closes the valve opening 37, the reed valve 36 shuts off the downstream side of the secondary air passage from the atmosphere.

Conventionally, the stiffness of the reed 40 was selected to be relatively high such that the resonance frequency of the reed 40 is significantly higher than the opening and closing frequency of the reed 40. In the illustrated embodiment, the stiffness of the reed 40 is significantly lower so that the resonance frequency of the reed 40 may be tuned to the opening and closing frequency of the reed 40 as will be discussed hereinafter.

As shown in FIG. 2, the reed 40 of the illustrated embodiment is made of a rectangular metallic plate member having a prescribed thickness. The reed 40 is provided with a substantially constant width, and has a base end fixedly attached to the valve base 38 with screws. Therefore, the effective length of the reed 40 is given as a length between the fixed base end to the free end thereof, or the length of the part of the reed 40 that is allowed to deflect with respect to the valve base 38.

The intermediate point of the exhaust passage 19 at which the secondary air passage 20 is connected (or the downstream end of the secondary air passage 20) is denoted as point A, and the point in the secondary air passage 20 immediately downstream of the reed valve 36 is denoted as point B. Suppose that the passage length between point A and point B is $L_1$.

How the opening and closing frequency $f_{R1}$, the resonance frequency $f_{R2}$ of the reed 40 and the passage length $L_1$ are related to one other is discussed in the following.

In the illustrated embodiment, the resonance frequency $f_{R2}$ of the reed 40 is configured to coincide with the opening and closing frequency $f_{R1}$ so that the reed 40 undergoes a substantially resonant vibration during its operation. Therefore, the oscillatory opening and closing movement of the reed 40 may be maintained with a minimum exciting force which in this case consists of periodic negative pressure transmitted from the exhaust passage 19. The opening and closing frequency $f_{R1}$ is selected as a multiple (z times) of the exhaust frequency of the engine, z being an integer. Preferably, the resonance frequency of the reed valve is two to five times the prescribed exhaust frequency of the engine ($2 \leq z \leq 5$). In the illustrated embodiment, z=3. The exhaust frequency is equal to the frequency of engine cycles. The exhaust frequency is one half of the rotational frequency of the engine 1 in the case of a four stroke engine because an exhaust stroke occurs once in every two revolutions of the engine. The exhaust frequency is equal to the rotational frequency of the engine 1 in the case of a two stroke engine because an exhaust stroke occurs once in each revolution of the engine.

When the rotational speed of the engine 1 is n (rpm), the rotational frequency $f_{ENG}$ (Hz) is given by (n/60) Hz (or $f_{ENG}$=n/60). In the case of a four stroke engine, because the exhaust valve opens once in every two revolutions of the engine 1, the exhaust frequency of the engine is given by $f_{ENG}/2$. Because the reed valve opens z times in each cycle of the engine, the opening and closing frequency $f_{R1}$ is related to the engine rotational speed as given in the following.

$$f_{R1}=f_{ENG}(z/2)=nz/120 \tag{1}$$

When the reed 40 is represented by a cantilever, the resonance frequency of the reed 40 can be given by the following equation.

$$f_{R2}=(\lambda^2/2\pi L_2)(EI/\mu)^{1/2} \tag{2}$$

where $\lambda=(\frac{1}{2})\pi$ in the case of the first order vibration, $L_2$ is the length of the reed (m), E is the Young's modulus of the material of the reed 40 (Pa), I is the second moment area of the reed (m$^4$), and $\mu$ is the mass per unit length of the reed (kg/m). In this case, only the first order vibration of the reed 40 is of interest.

In the illustrated embodiment, the material and configuration of the reed 40, and the rotational speed of the engine 1 are selected such that the resonance frequency $f_{R2}$ of the reed coincides with the opening and closing frequency $f_{R1}$, and z may be any integer, preferably 2 to 5, most preferably 3.

In the illustrated embodiment, the flow rate of the secondary air that passes through the reed valve 36 is increased by taking advantage of the pulsation effect of the air in the secondary air passage 20 or the resonance of the air column in the secondary air passage 20. How the passage length $L_1$ of the secondary air passage 20 is selected based on this principle is discussed in the following.

It is known in the field of intake system design that the pulsation effect of an engine can be exploited by selecting the length of the intake passage such that the following relation holds.

$$m'=30a/(nL) \tag{3}$$

where m' is the order of pressure pulsation (air column vibration) in the intake passage, a is the speed of sound (m/s), and L is the length of the intake passage (m).

Based on this well known principle, the resonant opening and closing movement of the reed valve 36 can be most efficiently excited by taking advantage of the pulsation effect of the air in the secondary air passage 20, and this effect can be optimized by selecting the passage length $L_1$ of the secondary air passage such that the following relation holds.

$$m=30a/(znL_1) \tag{4}$$

where m is the order of pressure pulsation in the secondary air passage, $L_1$ is the length of the secondary air passage (m) as measured between the downstream end the secondary air passage 20 and the reed valve 36, and m is preferably no greater than 5.

The maximum negative pressure that is utilized to open the reed valve 36 occurs when the inertia of the exhaust contributes to the maximization of the negative pressure in the exhaust port. If the secondary air intake timing for the next cycle is synchronized with this maximum negative pressure wave, the inertia effect will be maximized. Because this theory is equivalent to the theory of the inertia effect in the intake cycle, the equation for the inertia effect of an intake air pipe can be used.

$$q=(\theta/720)(30a/nL_1)$$

where $\theta$ is the duration (crank angle) for which the exhaust valve 13 is open, and q is the order of inertia effect resonance. A high inertia effect can be obtained if q is between 0.5 and 1.5, and the maximum inertia effect can be achieved when q=1.

Figure 3:
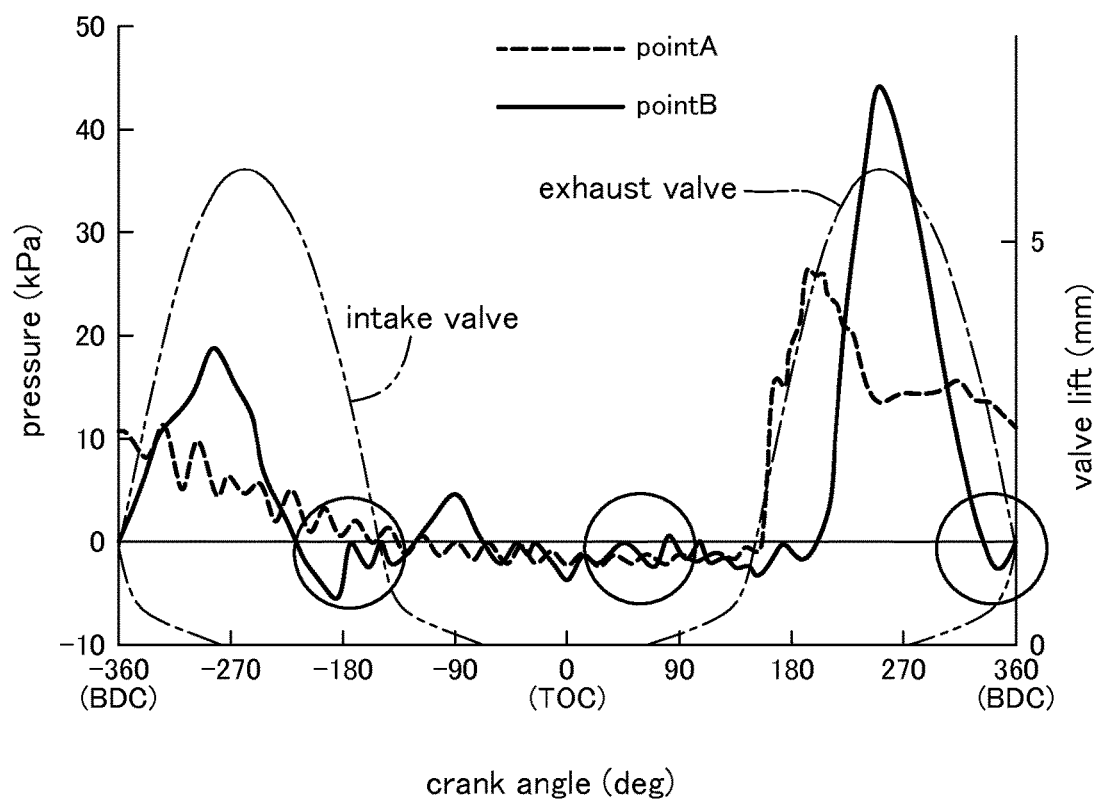
FIG. 3 is a graph showing the changes in the pressure at the downstream end (point A) and the upstream end (point B) of the secondary air passage.

FIG. 3 shows the pressure changes at point A and point B of the secondary air passage 20 when the engine is operated at 3,300 rpm. It can be noted that the negative pressure occurs only once in each engine cycle at pointy A. This is typically the case when the exhaust passage 19 is relatively short as is often the case with engines for generators. However, owing to the pulsation effect in the secondary air passage 20, the negative pressure occurs three times in each engine cycle at point B as indicated by circles. This causes the reed valve 36 to open three times in each engine cycle so that the open period of the reed valve 36 is increased, and the quantity of the secondary air that passes through the reed valve 36 is increased. This contributes to the promotion of the reaction in the catalytic converter 26. This is verified by the experiments conducted by the inventors. It can be surmised that the duration of each valve opening does not diminish significantly even when the frequency of valve openings in each engine cycle is increased, and the multiple opening of the reed valve 36 in each engine cycle results in an increase in the overall open period of the reed valve 36 in each engine cycle. Also, because the secondary air is introduced into the exhaust passage 19 multiple times in each engine cycle, the mixing of the exhaust with the secondary air is enhanced, and this additionally contributes to the promotion of the reaction in the catalytic converter 26.

In the illustrated embodiment, because the resonant frequency of the reed 40 coincides with the opening and closing frequency of the reed valve 36, the reed 40 is enabled to open with a relatively large lift even when the exciting force created by the negative pressure is relatively small, and the quantity of the secondary air can be increased. In the illustrated embodiment, the reed valve opens multiple times in each engine cycle, but it is still within the purview of the present invention to have the reed valve open only once in each engine cycle, and select the resonance frequency of the reed 40 so as to coincide with the exhaust frequency of the engine 1.

FIG. 4 shows the relationship between the secondary air flow rate and the length of the secondary air passage 20 when the engine is operated at 3,300 rpm. It can be seen that the quantity of the secondary air increases with the increase in the length $L_1$ of the secondary air passage 20. However, in small internal combustion engines, the passage length $L_1$ may not be increased owing to size restrictions. When the passage length $L_1$ is selected such that the order of pulsation resonance m is an integer in Equation (4), the quantity of the secondary air peaks. However, there is very little attenuation in the vicinity of 900 mm (or an intermediate point between the primary and secondary pulsation resonances). This is attributed to the fact that the amplification effect of the inertia peaked in this region. Therefore, it can be concluded that an optimum result can be achieved when the passage length is selected such that the inertia effect and/or the pulsation effect provide a high level of secondary air quantity.

On the other hand, as shown in FIG. 4, when the passage length $L_1$ is reduced beyond the point at which m=5, the secondary air quantity sharply drops. It is therefore advantageous to select the passage length $L_1$ such that m is equal to or less than 5 or $L_1$=275 mm or longer when the engine rotational speed is 3,300 rpm. Owing to size limitations, the passage length is desired to be no more than 800 mm. Based on such considerations, it is preferred that m is between 2 and 5, more preferably between 3 and 4.

Although the present invention has been described in terms of a preferred embodiment thereof, it is obvious to a person skilled in the art that various alterations and modifications are possible without departing from the scope of the present invention which is set forth in the appended claims. The contents of the prior art references mentioned in this application are incorporated in this application by reference.

The invention claimed is:

1. A method of operating an internal combustion engine including an exhaust purifying device, the exhaust purifying device comprising:
   an exhaust passage having an upstream end connected to an exhaust port of the engine and a downstream end provided with a catalytic converter;
   a secondary air passage having a downstream end connected to an intermediate point of the exhaust passage and an upstream end communicating with the atmosphere; and a reed valve provided in an upstream end of the secondary air passage to permit air flow from the atmosphere to the exhaust passage but not in the opposite direction;
   wherein the method comprises:
   providing the internal combustion engine including the exhaust purifying device;
   providing the exhaust purifying device including the reed valve; and
   operating the engine at a prescribed exhaust frequency, the prescribed exhaust frequency being a resonance frequency of the reed valve divided by z, where z is an integer from two to five (2≤z≤5), such that the reed valve undergoes resonant vibration during operation of the engine.

2. The method according to claim 1, wherein z is 3.

3. A method of operating an internal combustion engine including an exhaust purifying device, the exhaust purifying device comprising:
   an exhaust passage having an upstream end connected to an exhaust port of the engine and a downstream end provided with a catalytic converter;
   a secondary air passage having a downstream end connected to an intermediate point of the exhaust passage and an upstream end communicating with the atmosphere; and
   a reed valve provided in an upstream end of the secondary air passage to permit air flow from the atmosphere to the exhaust passage but not in the opposite direction;
   wherein the method comprises:
   providing the internal combustion engine including the exhaust purifying device;
   providing the exhaust purifying device including the reed valve; and
   operating the engine at a prescribed exhaust frequency, the prescribed exhaust frequency being a resonance frequency of the reed valve divided by z, where z is an integer from two to five (2≤z≤5), such that the reed valve undergoes resonant vibration during operation of the engine, wherein
   the internal combustion engine is a four stroke engine, and
   a length $L_1$ (m) of the secondary air passage of the exhaust purifying device, as measured between the downstream end thereof and the reed valve, is given by the following equation:

$m=30a/(znL_1)$ where m is the order of pressure resonant pulsation in the secondary air passage which is no greater than 5, a is the speed of sound (m/s) and n is the rotational speed (rpm) of the engine.

4. A method of operating an internal combustion engine including an exhaust purifying device, the exhaust purifying device comprising:
   an exhaust passage having an upstream end connected to an exhaust port of the engine and a downstream end provided with a catalytic converter;
   a secondary air passage having a downstream end connected to an intermediate point of the exhaust passage and an upstream end communicating with the atmosphere; and
   a reed valve provided in an upstream end of the secondary air passage to permit air flow from the atmosphere to the exhaust passage but not in the opposite direction;
   wherein the method comprises:
   providing the internal combustion engine including the exhaust purifying device;
   providing the exhaust purifying device including the reed valve; and
   operating the engine at a prescribed exhaust frequency, the prescribed exhaust frequency being a resonance frequency of the reed valve divided by z, where z is an integer from two to five (2≤z≤5), such that the reed valve undergoes resonant vibration during operation of the engine,
   wherein a length $L_1$ (m) of the secondary air passage of the exhaust purifying device, as measured between the downstream end thereof and the reed valve, is given such that the order of inertia effect resonance q given by the following equation is between 0.5 and 1.5:

$q=(\theta/720)(30a/nL_1)$ where θ is the open period (crank angle) of an exhaust valve for opening and closing the communication between the exhaust passage and a combustion chamber, a is the speed of sound (m/s) and n is the rotational speed (rpm) of the engine.

5. The method according to claim 4, wherein the order of inertia effect resonance q is 1.

* * * * *